March 18, 1930.  W. F. CORNELIUS ET AL  1,751,130

INSECT TRAP

Filed Aug. 25, 1928

Inventors
W. F. Cornelius
Henry Jacobs
By Johnston & Jennings
Attorneys

Patented Mar. 18, 1930

1,751,130

UNITED STATES PATENT OFFICE

WILLIAM F. CORNELIUS AND HENRY JACOBS, OF BIRMINGHAM, ALABAMA

INSECT TRAP

Application filed August 25, 1928. Serial No. 302,040.

Our invention relates to insect traps, particularly to traps for insects which fly by night and which are attracted by light, and has for its object the provision of a device of the character designated which shall be simple of design and easy of manufacture and which shall be adapted for use with an ordinary lamp without materially affecting the light from such a lamp.

A further object of our invention is to provide an insect trap together with simple effective supporting means therefor whereby it may be readily secured in position around an ordinary electric lamp and when in position is effective to trap flying insects without interfering with light from the lamp.

As is well known, insects which fly in the night are very annoying to anyone sitting by a light and are almost impossible to screen against. Even with the most careful screening of enclosed porches and the like, such insects will get through. While numerous forms of traps for such insects have heretofore been proposed, those with which we are familiar have not been adapted for association with a reading lamp or such due to the fact that they were unsightly and also to the fact that they interfered with the transmission of light from the lamp.

It is accordingly the prime object of our invention to provide a device of this character which shall not detract from the appearance of the lamp and which shall not interfere in any way with the light from the lamp. It is also our object to provide an insect trap which shall be particularly effective for catching insects and adapted for a wide field of use, such as for catching insects in orchards, gardens and the like.

Briefly, our invention comprises a circular trough surrounding the lamp and with the light producing portion of the lamp projecting below the trough, the trough containing some suitable mixture for killing the insects, and a translucent baffle member supported above the trough between its sides to deflect flying insects into the trough.

Devices embodying features of our invention are illustrated in the accompanying drawings, forming a part of this application, wherein—

Figure 1:
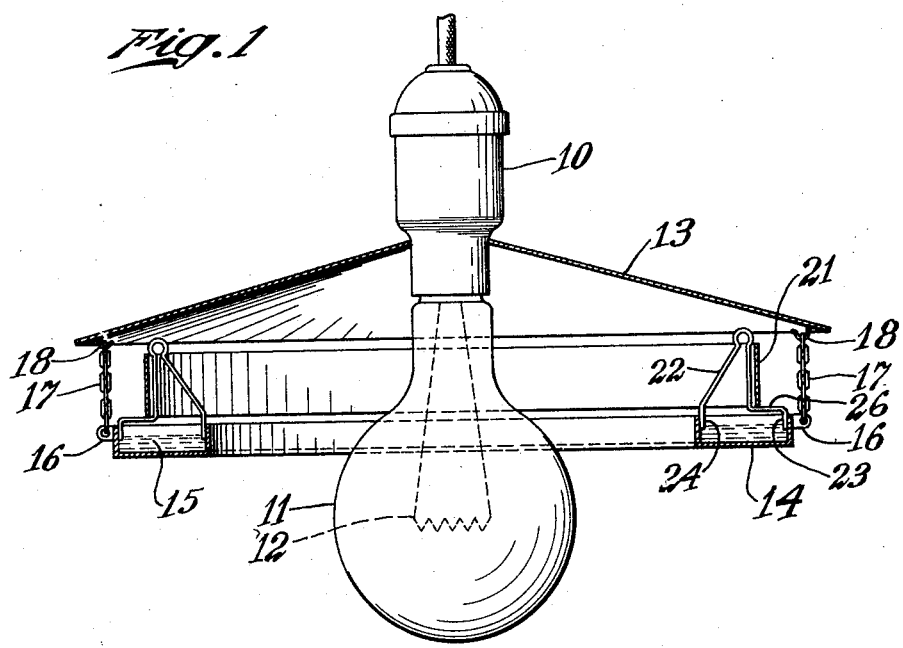
Figure 2:
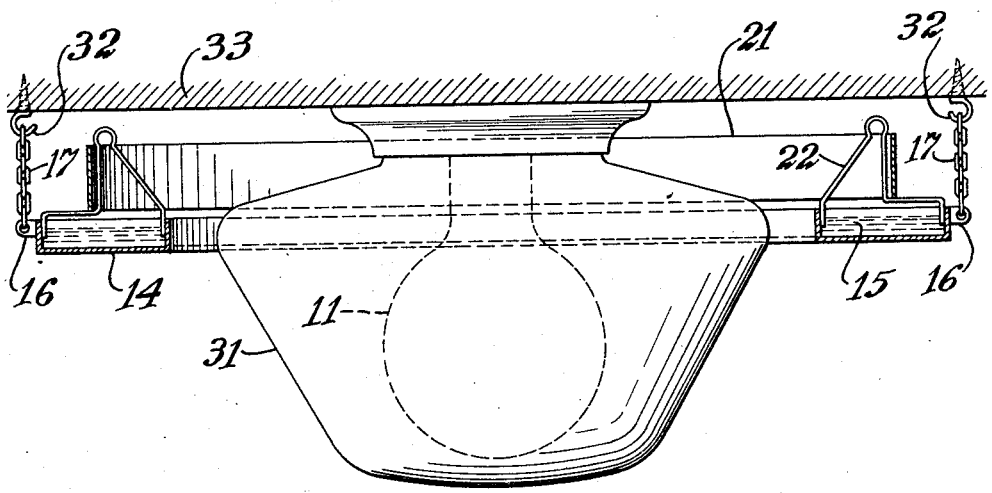

Fig. 1 is a sectional view showing our improved trap as adapted for a wide variety of uses; and Fig. 2 is a view similar to Fig. 1 and showing our improved trap in association with a different form of lamp.

Referring to the drawings for a better understanding of our invention, we show, in Fig. 1, an ordinary electric lamp of the "drop light" variety, comprising a base 10 and an electric bulb 11 with the usual light producing filament 12. The lamp is provided with an ordinary reflecting shade 13 supported from the base 10.

Surrounding the bulb 11 and above the light producing filament 12 is a circular trough 14 having lateral lugs 16 thereon to which are secured supporting chains 17. In the trough 14 is placed a suitable insect destroying or holding liquid, 15, many of which are well known in the art. The shade 13 is provided with hooks 18 for attaching the ends of the chains 17. It will also be apparent that the level of the trough 14 with respect to the shade 13, may be varied by hooking the chain 17 in various links thereof.

Arranged just above the trough 14 is a vertically extending baffle 21 which is made of any suitable translucent material, such as glass, mica, wire screen, etc. The baffle 21, as shown, lies between the upper sides of the trough 14 so that flying insects in striking it fall into the trough. The baffle 21 is removably supported by means of brackets 22 made of bent wire and formed to provide supporting legs 23 and 24 extending into the trough and with a horizontally extending portion 26 upon which the lower edge of the baffle rests. Whenever it is necessary to clean the trap or to remove the insects, the chains 17 are unhooked and the trough is taken down whereupon the baffle 21 may be readily removed and the apparatus cleaned.

It will be readily appreciated that the device just described is adapted for a variety of uses. For example it may be used in houses using drop lights or it may be used in gardens for destroying insect pests. It will also be appreciated that the use of an electric lamp is not essential to the operation of the device and various styles of lamps may be substituted therefor. In operation, insects attracted to the light, if approaching directly from the side, strike the baffle 21 and fall into the trough 14. If the insects first strike the bulb 11, they are deflected upwardly and in their circular flight, strike the inner side of the baffle 21 and fall into the trough 14. In use, we have found that practically all insects approaching the light quickly fall into the trough.

Referring now to Fig. 2 of the drawing, we show means by which our invention is adapted to be used with a well known type of ceiling lamp such as is used in rooms and enclosed porches. In this type of lamp the bulb is totally enclosed by a light diffusing shade 31 and the trough 14 is made of sufficient size to surround the shade. Instead of supporting the trough from the lamp as was shown in Fig. 1, we attach the chains 17 to hooks 32 secured in the ceiling 33 to which the light is attached. With this style of light, the operation of the trap is the same as has already been described and need not again be repeated.

From the foregoing it will be apparent that we have devised an improved insect trap which is particularly effective to entrap insects which fly by night and are attracted to a light, and which does not interfere with the light or detract from its appearance.

While we have shown our invention in but two forms, it will be obvious to those skilled in the art that it is not so limited, but is susceptible of various other changes and modifications, without departing from the spirit thereof, and we desire therefore, that only such limitations shall be placed thereupon as are imposed by the prior art, or as are specifically set forth in the appended claims.

What we claim is:

1. An insect trap adapted for association with an electric lamp, comprising a circular trough for an insect trapping liquid surrounding the lamp in spaced relation thereto, a translucent vertical baffle member removably supported above the trough between the sides thereof, and means for removably supporting the trough around the lamp with the light producing portion of the lamp below the trough.

2. An insect trap adapted for association with a lamp, comprising a circular trough for an insect trapping liquid and surrounding the lamp in spaced relation thereto, a translucent vertical baffle member removably supported above the trough between the sides thereof, a plurality of flexible members secured to the trough at intervals therearound, and a plurality of supporting hooks disposed above the light producing portion of the lamp to which the flexible members are adjustably attached and the trough is thereby supported with the light producing portion of the lamp projecting below the trough.

3. An insect trap adapted for association with a lamp having a shade, comprising a circular trough for an insect trapping liquid surrounding the lamp in spaced relation thereto, a translucent vertical baffle member removably supported above the trough between the sides thereof, a plurality of chains secured to the trough at intervals therearound, and a plurality of hooks carried by the shade to which the chains are adjustably attached and the trough is thereby supported with the light producing portion of the lamp projecting below the trough.

4. Apparatus as set forth in claim 3 in which the supporting means for the baffle member comprise bent wire brackets seated in the trough and formed to provide a horizontally extending portion on which the baffle member seats.

In testimony whereof we affix our signatures.

WILLIAM F. CORNELIUS.
HENRY JACOBS.